(12) United States Patent
Saitou et al.

(10) Patent No.: US 7,907,908 B2
(45) Date of Patent: *Mar. 15, 2011

(54) RADIO ACCESS POINT TESTING APPARATUS AND METHOD OF TESTING RADIO ACCESS POINT

(75) Inventors: Akihiro Saitou, Yokohama (JP); Yoshiaki Hasegawa, Yokohama (JP); Masao Yamaya, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 520 days.

This patent is subject to a terminal disclaimer.

(21) Appl. No.: 12/068,048

(22) Filed: Feb. 1, 2008

(65) Prior Publication Data

US 2008/0139198 A1    Jun. 12, 2008

Related U.S. Application Data

(63) Continuation of application No. 11/349,150, filed on Feb. 8, 2006, now Pat. No. 7,353,020, which is a continuation-in-part of application No. 10/910,583, filed on Aug. 4, 2004, now Pat. No. 7,366,508.

(30) Foreign Application Priority Data

May 12, 2005 (JP) ................................. 2005-139727

(51) Int. Cl.
*H04B 17/00* (2006.01)
*H04B 1/04* (2006.01)
*H04B 7/00* (2006.01)

(52) U.S. Cl. ...................... 455/67.13; 455/524; 455/129

(58) Field of Classification Search ................... 455/78, 455/80, 83, 88, 522, 69, 127.1, 524, 67.13, 455/129, 115

See application file for complete search history.

(56) References Cited

U.S. PATENT DOCUMENTS

| 5,710,984 | A |   | 1/1998 | Millar et al. |
|---|---|---|---|---|
| 5,930,707 | A | * | 7/1999 | Vambaris et al. ............. 455/424 |
| 6,094,577 | A | * | 7/2000 | Han ............................... 455/424 |
| 6,128,474 | A |   | 10/2000 | Kim et al. |
| 6,131,020 | A |   | 10/2000 | Oja et al. |
| 6,151,482 | A | * | 11/2000 | Eriksson ..................... 455/67.11 |
| 6,289,216 | B1 |  | 9/2001 | Koh et al. |
| 6,308,065 | B1 | * | 10/2001 | Molinari et al. .............. 455/424 |
| 6,310,579 | B1 | * | 10/2001 | Meredith ....................... 343/703 |
| 6,319,579 | B1 | * | 11/2001 | Strandgaard .................... 428/45 |
| 6,453,152 | B1 | * | 9/2002 | Hong et al. ................. 455/67.11 |
| 6,766,164 | B1 | * | 7/2004 | Funk et al. ..................... 455/423 |
| 6,812,885 | B2 | * | 11/2004 | Brettner et al. ................ 342/173 |
| 7,535,971 | B2 | * | 5/2009 | Yen et al. ....................... 375/267 |
| 2002/0119772 | A1 | * | 8/2002 | Yoshida ........................ 455/423 |
| 2004/0152431 | A1 |  | 8/2004 | Johnson |

(Continued)

FOREIGN PATENT DOCUMENTS

JP    05014291    1/1993

(Continued)

*Primary Examiner* — Tilahun Gesesse
(74) *Attorney, Agent, or Firm* — Brundidge & Stranger, P.C.

(57) ABSTRACT

A reception sensitivity is measured at a high precision. An access terminal function portion includes the transmitter part and receiver part of a communication terminal in a radio communication system. A path switch part effects switching to connect the input ends of receivers to antennas or to terminate them. The path switch part switches the paths of a signal from a transmitter and signals toward the receivers. An access point controller adjusts a packet error rate into a predetermined range, and obtains the reception sensitivity based on the transmission power of the access terminal function portion after the adjustment.

9 Claims, 13 Drawing Sheets

U.S. PATENT DOCUMENTS

| | | |
|---|---|---|
| 2005/0176375 A1 | 8/2005 | Bednasz et al. |
| 2005/0202859 A1 | 9/2005 | Johnson et al. |
| 2006/0274657 A1 | 12/2006 | Olgaard et al. |

FOREIGN PATENT DOCUMENTS

| | | |
|---|---|---|
| JP | 06291739 | 10/1994 |
| JP | 08065229 | 3/1996 |
| JP | 10503336 | 3/1998 |
| JP | 11154903 | 6/1999 |
| JP | 2000332674 | 11/2000 |
| JP | 2001230737 | 8/2001 |
| JP | 2002271280 | 9/2002 |
| JP | 2005151189 | 6/2005 |
| JP | 2005532711 | 10/2005 |

* cited by examiner

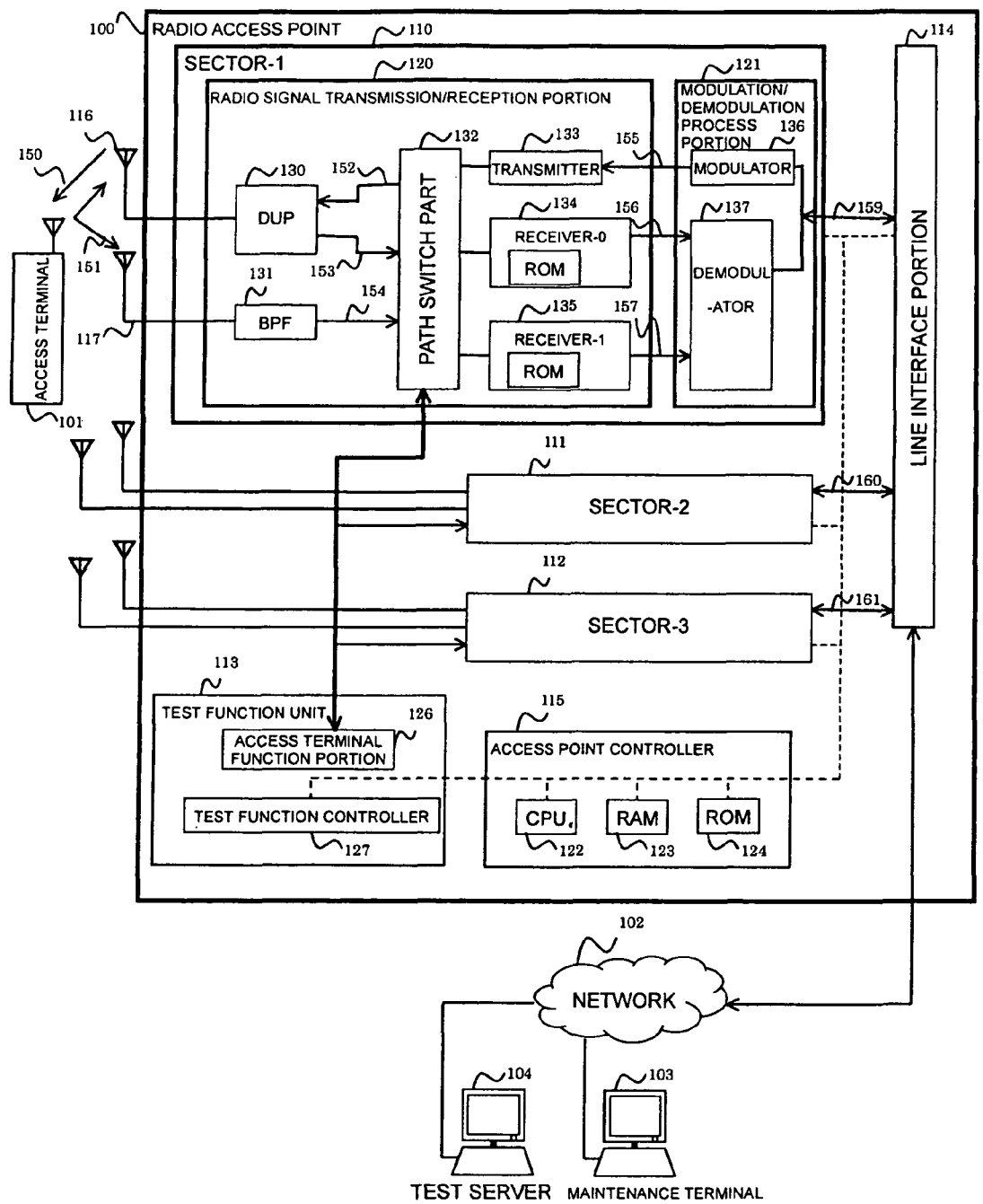
F I G. 1

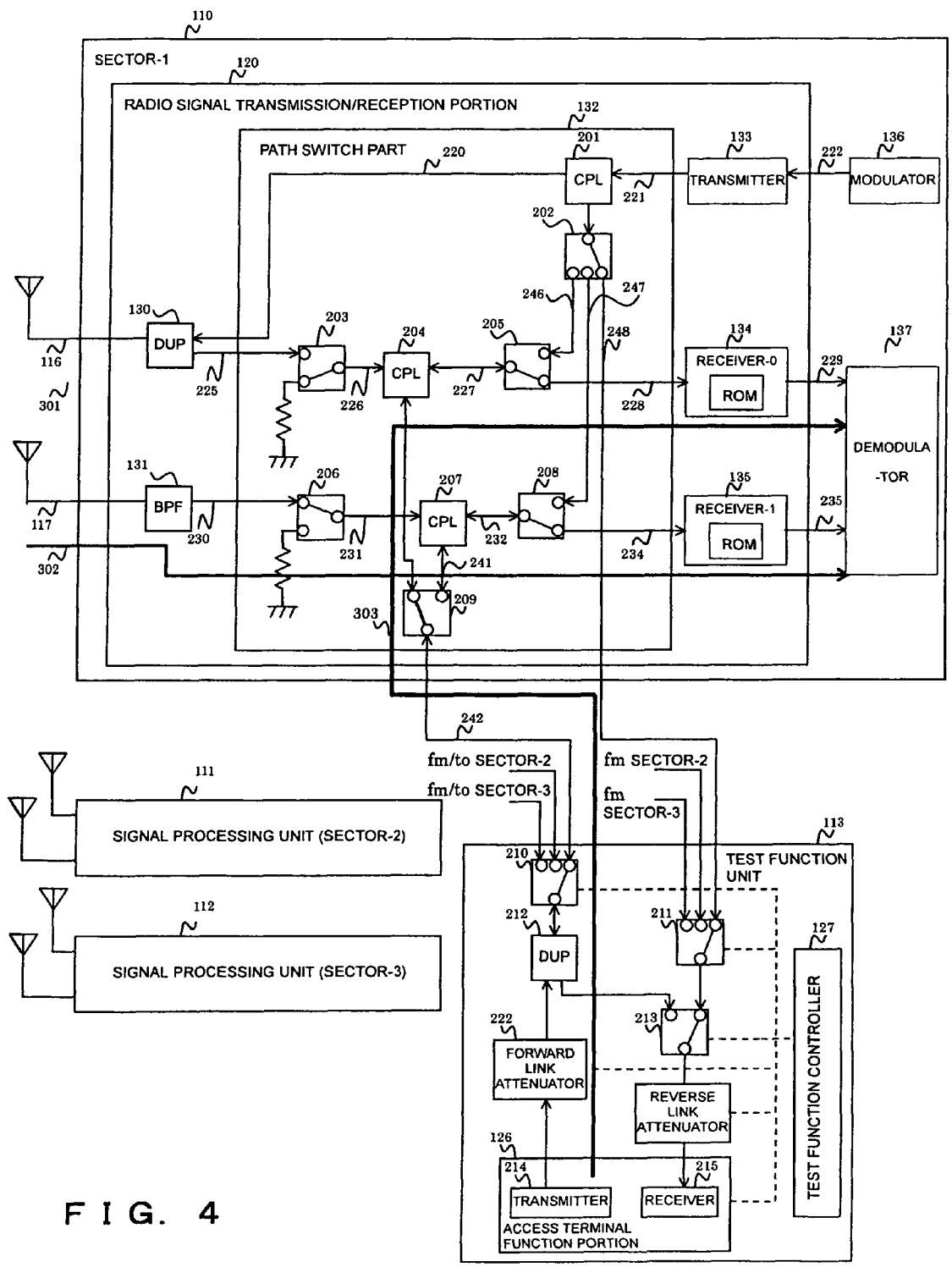
F I G. 4

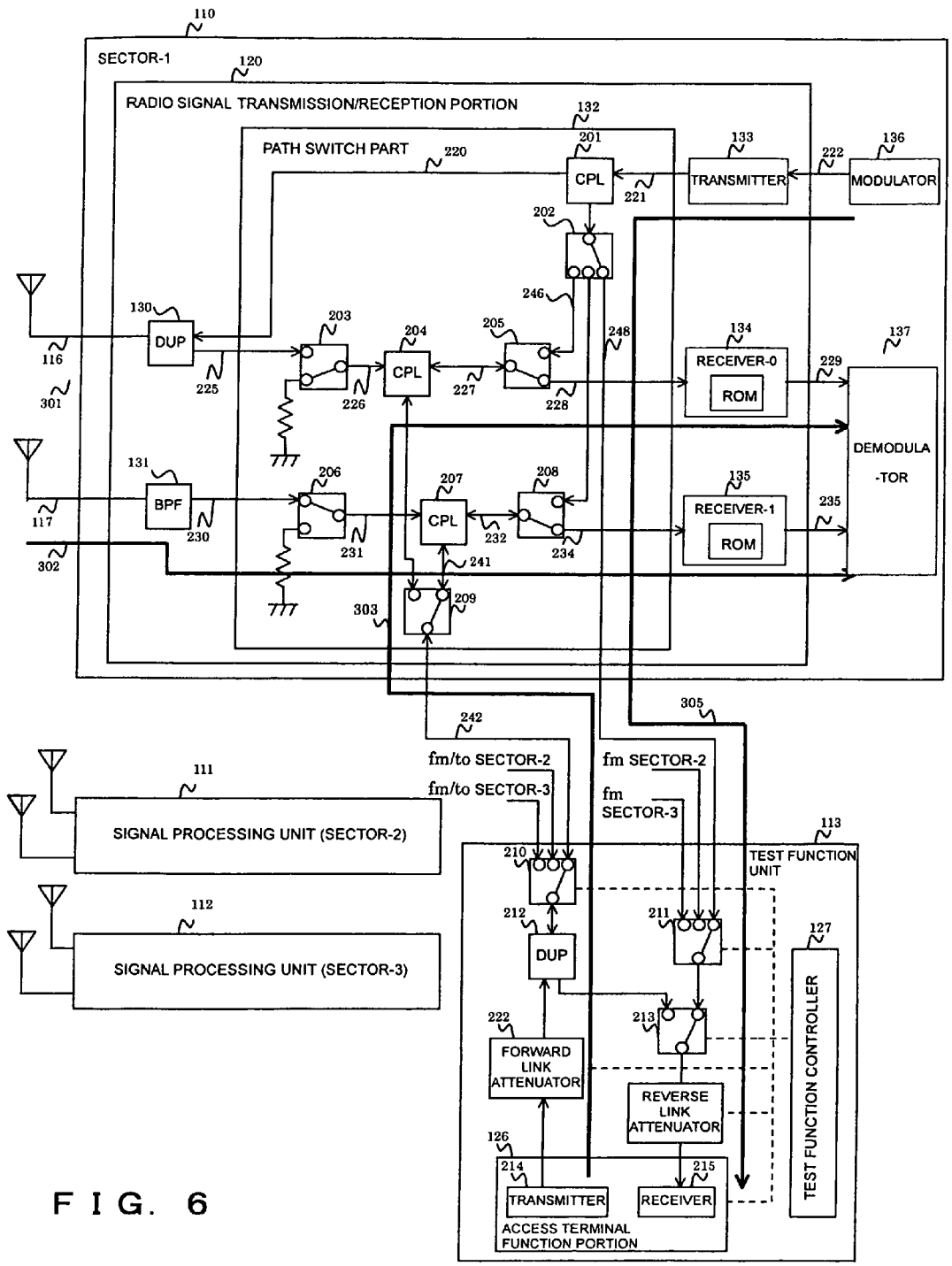
F I G. 6

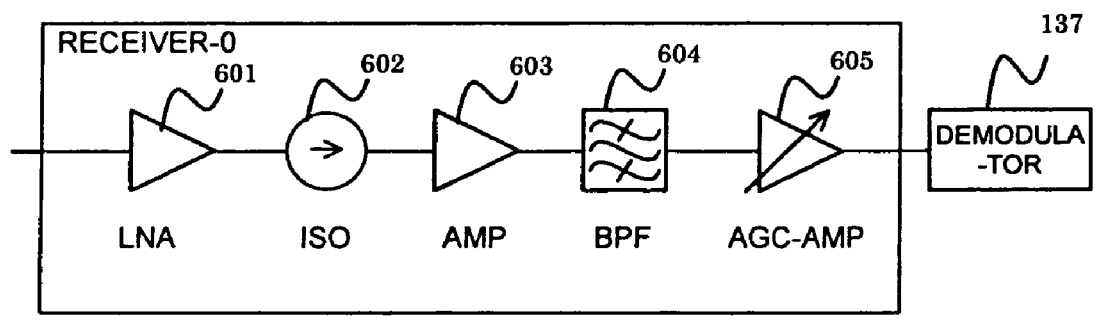
F I G. 1 0

|  | ACCESS POINT RECEPTION POWER ① (EXPECTED VALUE : −70) | | | TAT RECEPTION POWER ② (EXPECTED VALUE : −70) | | | ANALYTICAL RESULT |
|---|---|---|---|---|---|---|---|
|  | MEASURED VALUE | DIFFE-RENCE | DECI-SION | MEASURED VALUE | DIFFE-RENCE | DECI-SION |  |
| Case 1 | −72 | −2 | ○ | −71 | −1 | ○ | NORMAL |
| Case 2 | −72 | −2 | ○ | −80 | −10 | × | FAULT OF RECEIVER PART 215 |
| Case 3 | −85 | −15 | × | −69 | 1 | ○ | FAULT OF RECEIVER 134 |
| Case 4 | −82 | −12 | × | −83 | −13 | × | EXCESSIVE PATH LOSS |

F I G. 1 1

|        | f 1   | f 2   | f 3   |
|--------|-------|-------|-------|
| LOOP-0 | −1.2  | −0.3  | −0.8  |
| LOOP-1 | −1.0  | +0.1  | −0.6  |

FIG. 12

RADIO ACCESS POINT TESTING APPARATUS AND METHOD OF TESTING RADIO ACCESS POINT

CROSS-REFERENCES TO RELATED APPLICATIONS

The present application is a continuation application of application Ser. No. 11/349,150, filed Feb. 8, 2006, now U.S. Pat. No. 7,353,020; which is a continuation-in-part of application Ser. No. 10/910,583, filed Aug. 4, 2004, now U.S. Pat. No. 7,366,508 which claims priority of Japanese Application No. 2005-139727, filed May 12, 2005 and Japanese Application No. 2003-386193, filed Nov. 17, 2003, all of the disclosure of which are hereby incorporated by reference into this application.

BACKGROUND OF THE INVENTION

The present invention relates to a radio access point testing apparatus and a method of testing a radio access point, and more particularly to a radio access point testing apparatus and a method of testing a radio access point in a mobile communication system.

In operating the mobile communication system, the stability of the system is one of important factors. For the stable operation of the system, it is required to prevent the occurrence of any failure leading to a system operation stop, and also to promptly detect the failure and resume the system operation in case of the occurrence of the failure. Accordingly, the failure detection circuit of the radio access point and a diagnostic method therefor are very important.

A transmitter and a receiver are mounted in the radio access point. The failure detection of the transmitter of them can be incarnated comparatively easily in such a way that part of a transmission main signal generated by the transmitter is branched and then monitored. In contrast, the failure detection of the receiver cannot be incarnated merely by branching and monitoring part of a reception signal. The reason therefor is that the power of the reception signal which is inputted to the receiver fluctuates every moment in accordance with an installation environment, the number of connected access terminals, etc., so a threshold value for deciding whether a reception power value is normal or abnormal cannot be determined. Accordingly, the failure detection of the receiver is generally incarnated in such a way that any known test signal is inputted to the receiver so as to monitor the reception state of the receiver.

The diagnostic scheme of the receiver is broadly classified into two schemes, depending upon a method of generating the test signal. One of them is a scheme wherein part of the output signal of the transmitter mounted in the same radio access point apparatus is branched so as to use the branched part as the test signal. This scheme is also called the "loopback test". The other is a scheme wherein a test signal generator for outputting the test signal is mounted in the same radio access point apparatus. Neither of the methods, however, cannot perform a measurement in remote and on-line fashion.

A technique for confirming the normality of the radio access point remotely and on-line is disclosed in, for example, Patent Document 1. The technique is a method wherein a telephone within an operation center connected to a network including the radio access point apparatus, vocally communicates with a portable terminal within the access point, via the network, thereby to test the access point apparatus and the network. Besides, Patent Document 2, for example, discloses a technique wherein a similar test method has been expanded into a method of confirming the normality of a packet data call processing function, not the vocal communications.

[Patent Document 1] JP-A-2000-332679
[Patent Document 2] JP-A-2002-271280

SUMMARY OF THE INVENTION

Each of the two prior-art examples can detect the abnormality of the reception path of the radio access point apparatus, but it has the problem that a radio characteristic change such as a reception performance degradation attendant upon a slight degree of fault cannot be decided quantitatively. A further problem is that a faulty part cannot be specified.

In order to solve the problems, the reception sensitivity of the radio access point apparatus needs to be measured at a high precision. Besides, in performing the receiver sensitivity measurement, the influence of external noise from an antenna installation must be considered. In an installation environment of heavy external noise, the reception sensitivity is sometimes reported to be worse than the original reception sensitivity value of the access point. The reason therefor is that the external noise inputted via the antenna is superposed on the test signal, so the S/N (Signal To Noise Ratio) of the signal lowers to degrade the reception sensitivity of the access point.

In view of the above points, the present invention has its object to provide a radio access point testing apparatus and a method of testing a radio access point as measure a reception sensitivity at a high precision. Another object of the invention is to exclude the influence of external noise and to calibrate a measurement loop before a receiver sensitivity measurement, thereby to measure a reception sensitivity at a high precision. Still another object of the invention is to diagnose a receiver and a signal path. Yet another object of the invention is to specify a cause in a case, for example, where a receiver sensitivity measurement value as desired has not been attained.

In the invention, the reception sensitivity is measured by furnishing a radio access point apparatus with a test terminal called a "TAT (access terminal function portion)". The TAT is the test terminal which is endowed with the same call processing function as that of a general access terminal. Owing to the endowment with the same call processing function as that of the general access terminal, the reception sensitivity can be measured without influence on a general service. Besides, a radio-frequency switch is connected to an antenna input end in order to exclude a measurement error ascribable to the external noise. During the receiver sensitivity measurement, the switch is set so as to cut off the section between the antenna and an access point receiver, so as to prevent the external noise from being inputted.

Further, the normality of the path between the TAT and the access point receiver is confirmed using the output signal of a transmitter mounted in the access point. Thus, when the receiver sensitivity measurement value as desired, for example, has not been acquired, it is permitted to specify the cause.

In order to incarnate these functions, the reception sensitivity of the access point is measured by the following procedure of steps in the invention, but the measurement may well be performed by an appropriate procedure of steps without being restricted to the indicated steps:

(1) Confirmation of Normality of Path between TAT and Access point receiver
(2) Calibrations of Path loss between TAT and Access point receiver and Transmitter within TAT
(3) Receiver sensitivity measurement of Access point receiver According to a first solving means of this invention, there is provided a radio access point testing apparatus comprising:
an access terminal function portion which includes a transmitter part and a receiver part of a communication terminal in a radio communication system, and which serves to test a radio access point;

either of a receiver of one loop and receivers of two loops, for receiving forward signals that are transmitted from said access terminal function portion and said communication terminal;

a transmitter for transmitting reverse signals that are transmitted to said access terminal function portion and said communication terminal;

a path switch part for effecting switching so as to connect an input end of said receiver to an antenna or to terminate the input end, and for switching paths of the signal from said transmitter and the signal toward said receiver; and an access point controller which controls said access point;

wherein said access point controller receives a test start command, terminates the input end of said receiver by said path switch part in compliance with the command, and connects a desired one of said transmitter and said receiver with said access terminal function portion, so as to control either or both of:

(1) a receiver sensitivity measurement in which a packet error rate is adjusted into a predetermined range, and in which a reception sensitivity is obtained on the basis of transmission power of said access terminal function portion after the adjustment; and (2) a measurement path diagnosis which acquires a first reception power value of said receiver in the case of connecting said receiver with said transmitter part of said access terminal function portion, and a second reception power value of said access terminal function portion in the case of connecting said transmitter with said receiver part of said access terminal function portion, and in which failures of said receiver and the signal path are diagnosed depending upon whether or not a difference between the first reception power value and a predetermined first reception power expectation, and a difference between the second reception power value and a predetermined second reception power expectation lie within predetermined ranges, respectively.

According to a second solving means of this invention, there is provided in a radio access point having an access terminal function portion which includes a transmitter part and a receiver part of a communication terminal in a radio communication system, and which serves to test a radio access point; either of a receiver of one loop and receivers of two loops, for receiving forward signals that are transmitted from the access terminal function portion and the communication terminal; a transmitter for transmitting reverse signals that are transmitted to the access terminal function portion and the communication terminal; a path switch part for effecting switching so as to connect an input end of the receiver to an antenna or to terminate the input end, and for switching paths of the signal from the transmitter and the signal toward the receiver; and an access point controller which controls the access point;

a method of testing the radio access point, comprising:

receiving a test start command; and terminating the input end of said receiver by said path switch part in compliance with the test start command, and connecting a desired one of said transmitter and said receiver with said access terminal function portion, so as to control either or both of:

(1) a receiver sensitivity measurement in which a packet error rate is adjusted into a predetermined range, and in which a reception sensitivity is obtained on the basis of transmission power of said access terminal function portion after the adjustment; and (2) a measurement path diagnosis which acquires a first reception power value of said receiver in the case of connecting said receiver with said transmitter part of said access terminal function portion, and a second reception power value of said access terminal function portion in the case of connecting said transmitter with said receiver part of said access terminal function portion, and in which failures of said receiver and the signal path are diagnosed depending upon whether or not a difference between the first reception power value and a predetermined first reception power expectation, and a difference between the second reception power value and a predetermined second reception power expectation lie within predetermined ranges, respectively.

Incidentally, the receiver sensitivity measurement comprises by way of example:

that an access point controller sets a path switch part so as to connect a receiver with a transmitter of an access terminal function portion;

that the access terminal function portion establishes a calling connection state with a predetermined device through a modulation/demodulation process portion, and transmits packets; that the access point controller obtains a packet error rate;

that the access point controller commands the access terminal function portion to alter transmission power, in accordance with the obtained packet error rate;

that the access terminal function portion alters the transmission power in compliance with the command from the access point controller;

that the access terminal function portion transmits an altered transmission power value to the access point controller;

that the access point controller receives the transmission power value, and stores the received transmission power value in a storage unit;

that the access point controller obtains a packet error rate again;

that the access point controller judges if the obtained packet error rate lies within a predetermined range, and that it repeats commanding the access terminal function portion to alter transmission power and then receiving and storing a transmission power value until the packet error rate comes to lie within the predetermined range;

that the access point controller calculates a reception sensitivity on the basis of the transmission power value at a time when the packet error rate lies within the predetermined range; and that the access point controller stores a test result which contains the calculated reception sensitivity and/or a failure decision result based on the reception sensitivity, in the storage unit, or transmits the test result to a maintenance device.

According to the present invention, it is possible to provide a radio access point testing apparatus and a method of testing a radio access point as measure a reception sensitivity at a high precision. Besides, according to the invention, the influence of external noise is excluded, and a measurement loop is calibrated before the measurement of the reception sensitivity, whereby the reception sensitivity can be measured at a high precision. According to the invention, a receiver and a signal path can be diagnosed. Moreover, according to the invention, in a case, for example, where a receiver sensitivity measurement value as desired has not been obtained, the cause of the situation can be specified.

BRIEF DESCRIPTION OF THE DRAWINGS

FIG. 1 is a block diagram of a radio access point according to an embodiment of the present invention;

FIG. 4 is a diagram (2) for explaining a radio signal path in the case of measuring the reception sensitivity of the loop-0 of the sector-1 in the invention;

FIG. 6 is a diagram (4) for explaining a radio signal path in the case of measuring the reception sensitivity of the loop-0 of the sector-1 in the invention;

FIG. 10 is a block diagram in the case of performing a reception power measurement in the invention;

FIG. 11 is a diagram for explaining receiver diagnoses in the invention;

FIG. 12 is an example of a receiver correcting table in the invention; and

DETAILED DESCRIPTION OF THE PREFERRED EMBODIMENTS

Figure 2:
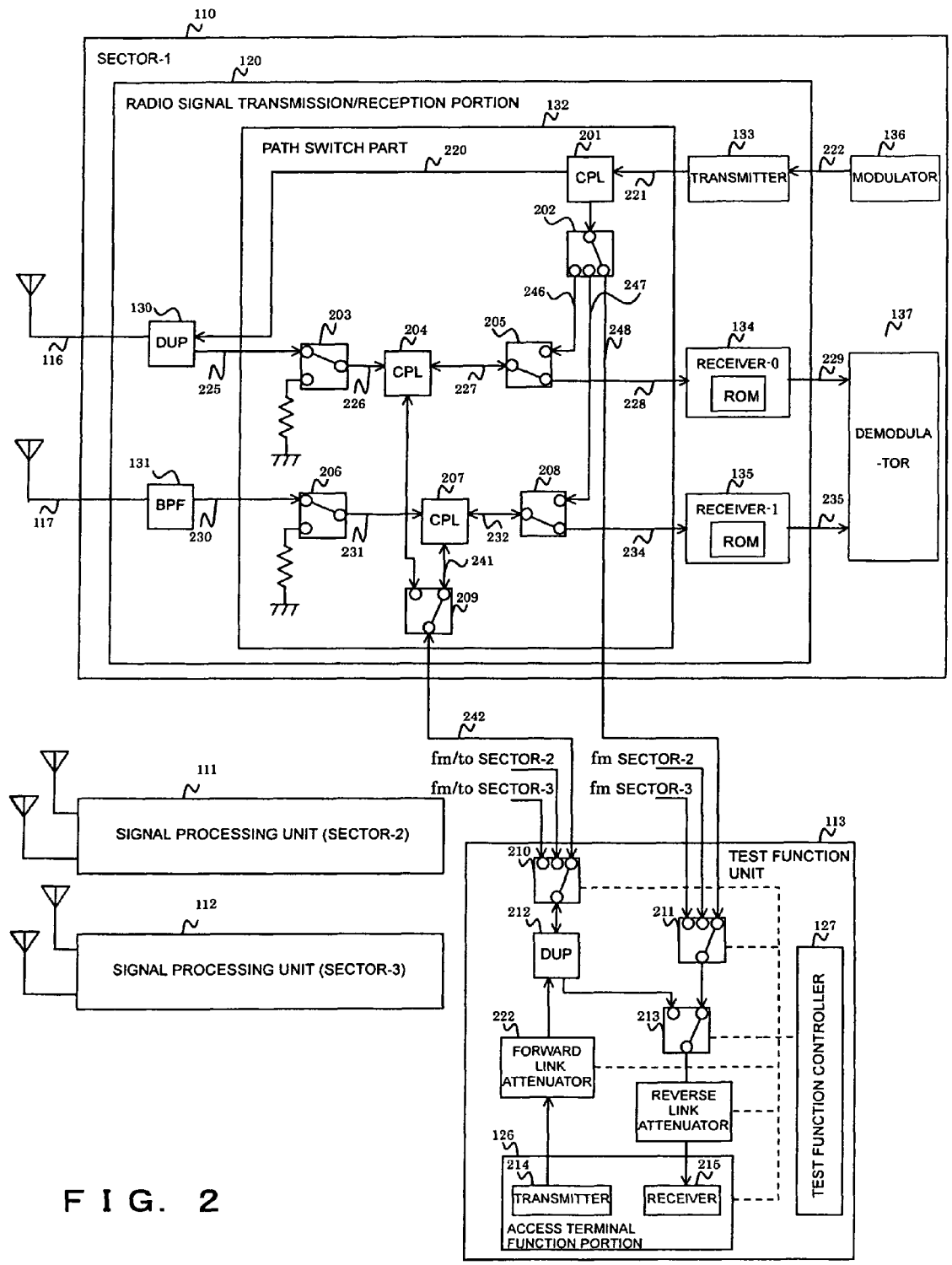
FIG. 2 is a detailed configurational diagram of the path switch part and test function unit of sector-1 in the invention.

An embodiment of the present invention will now be described with reference to the drawings by exemplifying a radio access point of 3-sector configuration which includes a transmitter of one loop and receivers of two loops per sector, and which incarnates diversity reception.

FIG. 1 is a configurational diagram of the radio access point. Included in the radio access point 100 are three sectors (sector-1 110, sector-2 111 and sector-3 112), a test function unit 113, a line interface portion 114 and an access point controller 115.

The signal processing unit (sector-1) 110 includes a radio signal transmission/reception portion 120 and a modulation/demodulation process portion 121, and a loop-0 antenna 116 shared by transmission and reception and a loop-1 antenna 117 for reception, for example, are connected to this signal processing unit. The radio signal transmission/reception portion 120 includes a path switch part 132 for switching transmission/reception paths, and the transmitter 133 of one loop, as well as the receivers of two loops (receiver-0 134 and receiver-1 135). Further, the radio signal transmission/reception portion 120 includes a DUP (duplexer) 130 which separates a reverse radio signal 150 and a forward radio signal 151, and a BPF (band-pass filter) 131 which limits the pass band of the forward radio signal 151. Incidentally, the number of sectors is not limited to three, but one sector or an appropriate number of sectors may well be included. Besides, the receivers and the transmitter(s) may well be disposed in appropriate numbers of loops.

The transmitter 133 converts a reverse baseband signal 155 inputted from a modulator 136, into a reverse radio signal 152. The receiver-0 134 receives the forward radio signal 151 transmitted by an access terminal 101, through the DUP 130 (as a signal 153), so as to convert the received signal into a forward baseband signal 156. On the other hand, the receiver-1 135 receives the forward radio signal 151 transmitted by the access terminal 101, through the BPF 131 (as a signal 154), so as to convert the received signal into a forward baseband signal 157. Incidentally, since the configuration of each of the sector-2 111 and sector-3 112 may be identical to the configuration of the sector-1 110, it shall be omitted from description.

The modulation/demodulation process portion 121 includes the modulator 136 and a demodulator 137, and it modulates and demodulates data. The line interface portion 114 is the interface between the radio access point 100 and a network 102. The access point controller 115 has the functions of monitoring and controlling the radio access point 100. The test function unit 113 includes, for example, an access terminal function portion 126 and a test function controller 127. Incidentally, the practicable configuration of the test function unit 113 will be described later.

A maintenance terminal 103 is connected to the access point controller 115 via the network 102, and it has the functions of remotely monitoring and controlling the radio access point 100. A test server 104 is a server for testing, and the access terminal function portion 126 in the test function unit 113 connects this test server via the network 102.

FIG. 2 is a detailed configurational diagram of the path switch part and the test function unit. Besides, FIGS. 3-6 are diagrams (1)-(4) for explaining radio signal paths, respectively. A receiver sensitivity measurement according to the embodiment of the invention will be described with reference to FIGS. 2-6. Incidentally, although FIG. 2 illustrates the internal configuration of the sector-1 110, each of the sector-2 111 and the sector-3 112 may be identical in configuration to the sector-1 110 and shall therefore be omitted from description.

In this embodiment, the test function unit 113 is mounted in the radio access point 100, and the path switch part 132 is mounted in the radio signal transmission/reception portion 120. The path switch part 132 includes, for example, three CPLs (directional couplers) and six SWs (radio-frequency switches). Incidentally, the CPLs and the SWs may well be disposed in appropriate numbers without being limited to the above numbers.

The CPL 201 (second directional coupler) connects the transmitter is 133, the DUP 130 (or a path to the antenna) and the SW 202 (or a path to the test function unit) to one another. Besides, the CPL 204 (first directional coupler) connects the SW 205 (the receiver-0 or the transmitter), the SW 203 (a path to the antenna or a terminating part for termination) and the SW 209 (a path to the access terminal function portion) to one another. The CPL 207 connects the SW 208 (the receiver-1 or the transmitter), the SW 206 (a path to the antenna or a terminating part for termination) and the SW 209 (the path to the access terminal function portion) to one another.

The CPL 201 extracts part of a reverse radio signal 221 so as to output the extracted part to the test function unit 113. The CPL 204 extracts part of the reverse radio signal extracted by the CPL 201, so as to output the extracted part to the test function unit 113. Besides, the CPL 204 couples a forward test signal transmitted from the test function unit 113, to a loop-0 forward main signal path 227, so as to output the forward test signal to the receiver-0 134. The CPL 207 extracts part of the reverse radio signal extracted by the CPL 201, so as to output the extracted part to the test function unit 113. Besides the CPL 207 couples the forward test signal transmitted from the test function unit 113, to a loop-1 forward main signal path 232, so as to output the forward test signal to the receiver-1 135.

The SW 203 switches the input terminal of the receiver-0 134 so as to be connected to the loop-0 antenna 116 through the DUP 130, or to be terminated (connected to the terminating part). Besides, the SW 206 switches the input terminal of the receiver-1 135 so as to be connected to the loop-1 antenna 117 through the BPF 131, or to be terminated (connected to the terminating part). The SW 202 switches the part 221 of the reverse radio signal extracted by the CPL 201, so as to be outputted to the test function unit 113, to be outputted to the loop-0 forward main signal path 227, or to be outputted to the loop-1 main signal path 232.

The SW 205 switches, for example, the CPL 204 so as to be connected to the receiver-0 134, or to be connected to the transmitter 133. The SW 208 switches, for example, the CPL 207 so as to be connected to the receiver-1 135, or to be connected to the transmitter 133. By way of example, the SW 205 effects switching so as to output the forward test signal transmitted from the test function unit 113, to the receiver-0 134 (a signal path 303 in FIG. 4), or to output the reverse radio signal extracted by the CPL 201, to the test function unit 113 (a signal path 304 in FIG. 5). The SW 208 effects switching so as to output the forward test signal transmitted from the test function unit 113, to the receiver-1 135, or to output the reverse radio signal extracted by the CPL 201, to the test function unit 113. The SW 209 switches the test function unit 113 so as to be connected to the receiver-0 134, or to be connected to the receiver-1 135.

Figure 3:
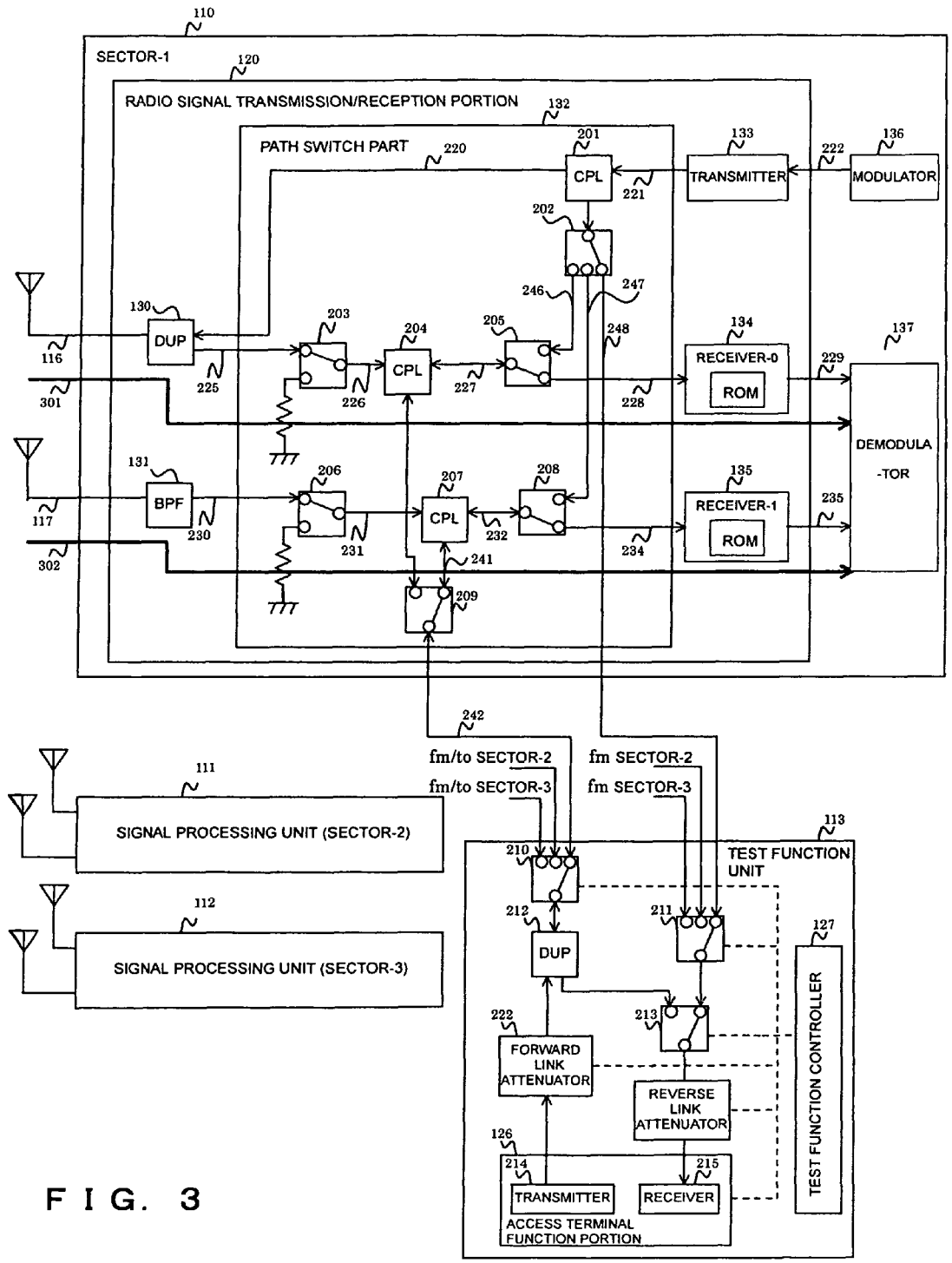
FIG. 3 is a diagram (1) for explaining a radio signal path in the case of measuring the reception sensitivity of the loop-0 of the sector-1 in the invention.
Figure 5:
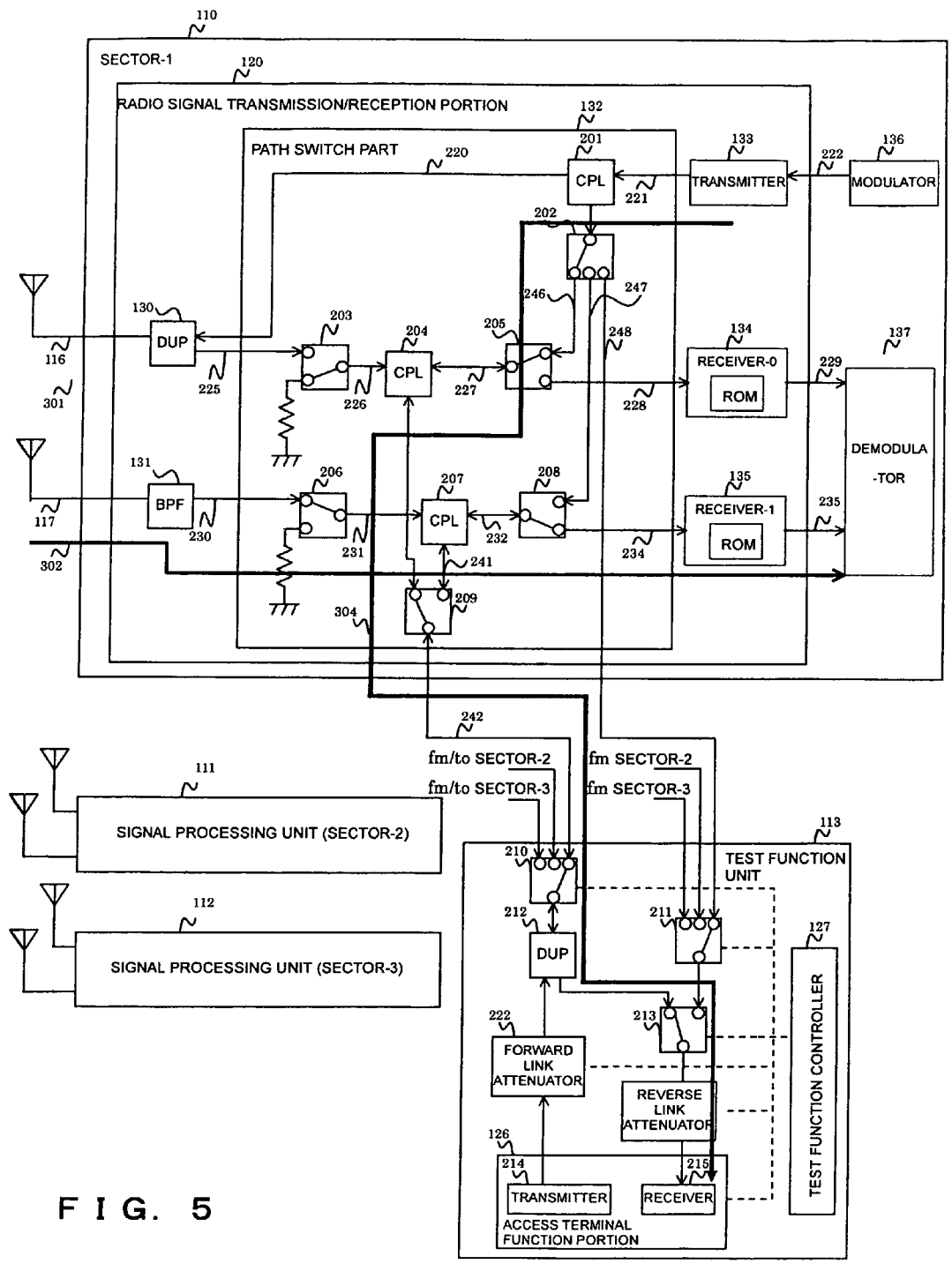
FIG. 5 is a diagram (3) for explaining a radio signal path in the case of measuring the reception sensitivity of the loop-0 of the sector-1 in the invention.

In an ordinary operation mode (a non-test mode), as shown in FIG. 3 is by way of example, the SW 203 is set on the side of the loop-0 antenna 116, and the SW 205 on the side of the receiver-0 134. Besides, the SW 206 is set on the side of the loop-1 antenna 117, and the SW 208 on the side of the receiver-1 135. That is, a loop-0 forward radio signal and a loop-1 forward signal are respectively inputted to the demodulator 137 through a signal path 301 and a signal path 302.

The test function unit 113 includes the access terminal function portion 126, the test function controller 127, three switches 210, 211 and 213, and a DUP 212. Incidentally, the switches may well be disposed in an appropriate number without being restricted to the above number. Besides, the test function unit 113 may well further include a forward link attenuator 222 and a reverse link attenuator. The access terminal function portion 126 is a testing terminal which has functions equivalent to those of the access terminal 101 which a general user uses. By way of example, the access terminal function portion 126 includes a transmitter part 214 and a receiver part 215. The test function controller 127 controls the access terminal function portion 126, and has the function of setting the three switches mounted in the test function unit 113. The SWs 210 and 211 have the functions of switching the sectors to-be-tested. Besides, the SW 213 switches the path of the reverse radio signal outputted by the transmitter 133 of the access point, between a signal path which extends via the forward signal path and a signal path which does not extend via the same. The DUP 212 separates the reverse test signal and the forward test signal.

FIG. 10 is a configurational diagram of the receiver. By way of example, the receiver-0 134 of the radio signal transmission/reception portion 120 includes an LNA (low-noise amplifier) 601 which amplifies a received signal at a low distortion, an ISO (isolator) 602, an AMP (amplifier) 603, a BPF (low-pass filter) 604 which attenuates unnecessary signal components other than the particular band of the receiver, and an AGC-AMP (automatic gain control amplifier) 605. Besides, the receiver may well include, for example, a memory (such as ROM) which is readable from the access point controller 115. The AGC-AMP 605 has the function of varying the gain of the amplifier in accordance with input power in order that signal power to be inputted to the demodulator 137 may be held constant. The receiver can measure a reception power value by using the gain value of the AGC-AMP 605.

As an example, let's consider a case where the gain of the AGC-AMP 605 is subjected to a closed loop control in order that the signal power which is inputted to the demodulator 137 may become 0 (zero) dBm. Among the components constituting the receiver, only the AGC-AMP 605 is of variable gain, and the other components (for example, the LNA 601 and the AMP 603) are of fixed gains. Accordingly, when the total of the gain values of all the components except the AGC-AMP 605 is denoted as a "receiver fixed gain", the following formula holds:

(Reception power)+(Receiver fixed gain)+
  (Gain of $AGC$-$AMP$)=0 dBm

That is, (Reception power)=−(Receiver fixed gain)−
  (AGC-AMP gain)

Since the receiver fixed gain is a known value, the reception power can be measured in accordance with the above formula. Incidentally, each of the receiver-1 135 and the receiver part 215 of the access terminal function portion 126 is similar in configuration to the receiver-0 134. Accordingly, the measurement of the reception power of each receiver can be incarnated by the same scheme.

(Measurement Path Diagnosis)

Figure 7:
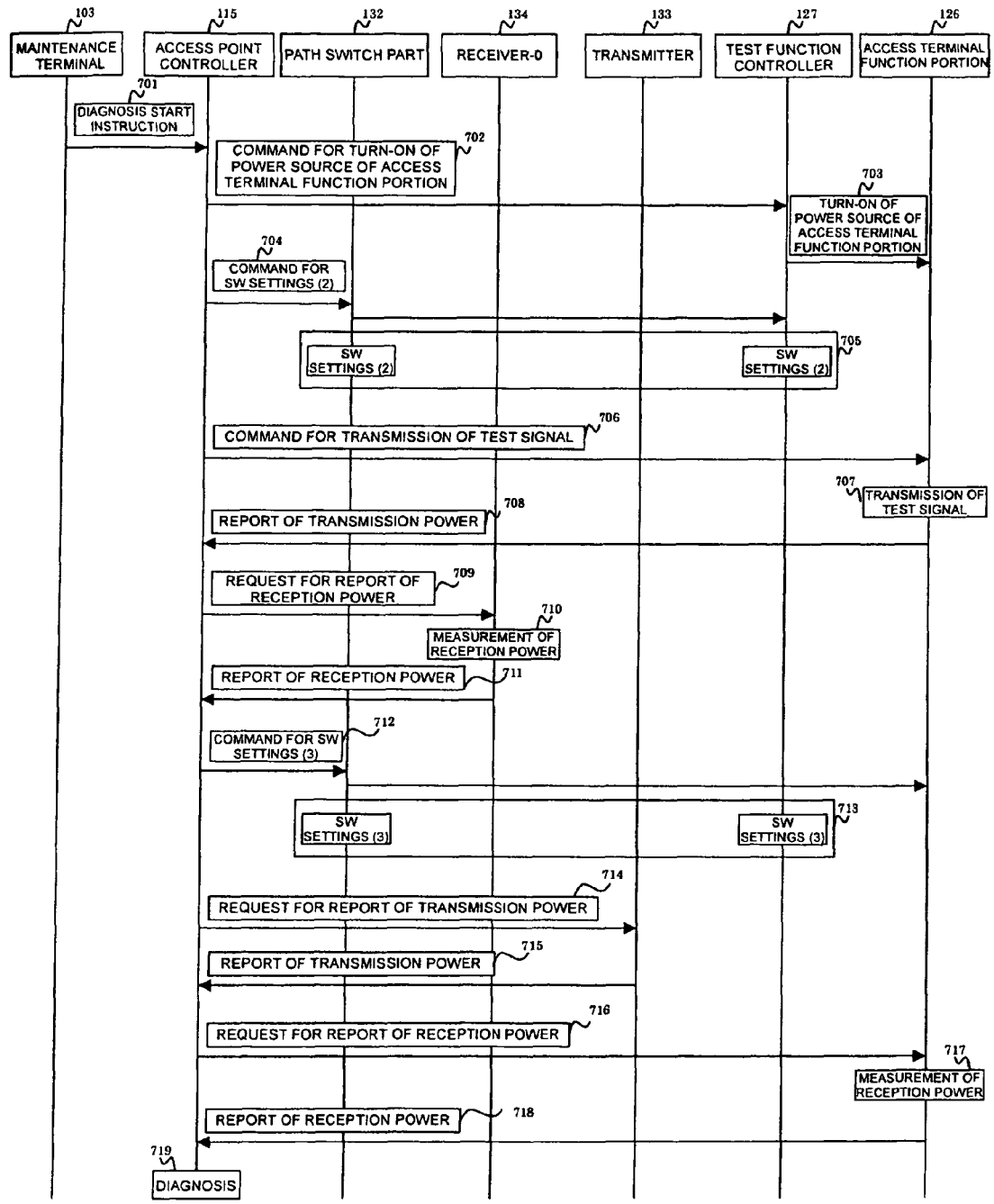
FIG. 7 is a diagram for explaining a sequence in the case of performing a measurement path diagnosis in the invention.

FIG. 7 is a diagram for explaining a sequence in the case of performing a measurement path diagnosis. A method of diagnosing the receiver-0 will be described with reference to FIG. 7. Incidentally, since the other receivers can be diagnosed by the same steps of procedure, they shall be omitted from description. Besides, signals "Ack" replying to requests shall be omitted because they are ordinarily existent.

The measurement path diagnosis is started, for example, in such a way that a maintenance engineer inputs an instruction for the measurement path diagnosis, to the maintenance terminal 103. The measurement-path-diagnosis execution instruction contains measurement conditions such as the designation of the access point for the measurement and the designations of the sector to-be-handled and the receiver to-be-handled. Here, description will be made assuming the diagnosis of the loop-0 of the sector-1 in the access point 100. Incidentally, apart from the input by the maintenance engineer, the measurement path diagnosis may well be started at an appropriate timing, for example, in such a way that the measurement is started at a predetermined time in accordance with a schedule stipulated beforehand.

At a step 701, the maintenance terminal 103 notifies a diagnosis start instruction containing the designated measurement conditions, to the access point controller 115 of the designated radio access point 100. Incidentally, the designations of the sector and the reception loop to-be-measured may well be omitted so as to successively conduct the tests of all the receivers of the radio access point 100.

At a step 702, the access point controller 115 receives the diagnosis start instruction, and it commands the test function controller 127 to turn ON the power source of the access terminal function portion 126 in compliance with the received instruction. At a step 703, the test function controller 127 turns ON the power source of the access terminal function portion 126.

At a step 704, the access point controller 115 commands the path switch part 132 and the test function unit 113 to set the switches (SW settings (2)). At a step 705, the switches of the path switch part 132 and test function unit 113 are set so as to pass through signal paths 302 and 303 in FIG. 4. By way of example, the SW 203 is set onto the terminating side, and the SWs 205 and 209 are respectively set onto the receiver-0 sides. Besides, the SW 210 of the test function unit 113 is set onto the sector-1 side. Incidentally, how the individual SWs are set can be stipulated in accordance with SW setting commands beforehand. The signal path 302 is a path in the ordinary operation mode. Accordingly, the receiver-1 135 which is connected to the loop-1 antenna 117 does not incur the stop of service.

At a step 706, the access point controller 115 commands the access terminal function portion 126 to transmit a test signal. The transmission command contains, for example, the settings of transmission power and a transmission frequency. Incidentally, the maintenance engineer may well be permitted to designate the power and the frequency from the maintenance terminal 103. At a step 707, the transmitter part 214 of the access terminal function portion 126 transmits the test signal. By way of example, the access terminal function portion 126 can transmit packets to the test server 104 by executing ping. Incidentally, apart from the ping, an appropriate command or application for transmitting the packets may well be executed. The transmitted signal passes through the signal path 303 in FIG. 4, and it is inputted to the receiver-0 134. The test signal is destined for, for example, the test server 104, and the receiver-0 134 and the demodulator 137 can process the test signal likewise to an ordinary reception signal. At a step 708, the access terminal function portion 126 reports the transmission power (TAT transmission power value) to the access point controller 132. The transmission power is reported, for example, after the test signal has been transmitted for a predetermined time period or in a predetermined quantity.

At a step 709, the access point controller 115 requests the receiver-0 134 to report reception power. At a step 710, the receiver-0 134 measures the reception power of the test signal. At a step 711, the receiver-0 134 reports the measured value of the reception power (access point reception power value) to the access point controller 115. The access point controller 115 records the reported TAT transmission power value and access point reception power value in a RAM 123 at an appropriate timing (hereinbelow, the reported values shall be written as "measurement values (1)").

At a step 712, commands for setting the switches are sent from the access point controller 115 to the path switch part 132 and test function unit 113 (SW settings (3)). At a step 713, the switches of the path switch part 132 and test function unit 113 are set so as to pass through the path 304 in FIG. 5. By way of example, the SW 202 is set onto the side of the forward main signal path 227, and the SW 205 onto the side of the transmitter 133. Incidentally, the SWs 203, 209 and 210 are in the same states as in FIG. 4. Besides, the SW 213 of the test function portion 113 is set onto the side of the forward main signal path 227.

At a step 714, the access point controller 115 requests the transmitter 133 to report the transmission power of this transmitter 133 (transmission power report request). At a step 715, the transmitter 133 reports the transmission power of this transmitter 133 (access point transmission power value) to the access point controller 115 in compliance with the transmission power report request. Either the transmission power for a predetermined time period or the instantaneous value of the transmission power may be reported as the transmission power value.

At a step 716, the access point controller 115 requests the receiver part 215 to report a reception power value. At a step 717, the receiver part 215 measures reception power which is being received. At a step 718, the receiver part 215 reports the measured reception power value (TAT reception power value) to the access point controller 115. The access point controller 115 records the reported access point transmission power value and TAT reception power value in the RAM 123 (hereinbelow, the reported values shall be written as "measurement values (2)").

At a step 719, the access point controller 115 diagnoses the normality of the path between the access terminal function portion 126 and the receiver-0 134, by using the measurement values (1) and (2) recorded in the RAM 123. The diagnosis is made in accordance with the procedure of steps stated below.

Initially, the normalities of the transmitter 133 of the access point and the transmitter part 214 within the access terminal function portion 126 are diagnosed using the access point transmission power value and TAT transmission power value which are recorded in the RAM 123. The access point controller 115 compares the access point transmission power value with the transmission setting power of the transmitter 133. When the difference between both the power values lies within a prescribed value (predetermined range), the transmitter 133 is diagnosed to be normal, and when the difference lies outside the prescribed value, the transmitter 133 is diagnosed to be abnormal. Incidentally, the transmission setting power of the transmitter 133 can be managed by, for example, the access point controller 115. Alternatively, the transmission setting power may well be acquired from another appropriate management portion or from the transmitter.

The access point controller 115 compares the TAT transmission power value with the TAT transmission setting power of the transmitter part 214. When the difference between both the power values lies within a prescribed value, the transmitter part 214 is diagnosed to be normal, and when the difference lies outside the prescribed value, the transmitter part 214 is diagnosed to be abnormal. Incidentally, the value set at the step 706 can be employed as the TAT transmission setting power. In a case where the transmitter 133 and/or the transmitter part 214 have/has been diagnosed to be abnormal, the access point controller 115 notifies the contents of the abnormality to the maintenance terminal 103 without executing later steps, whereupon the test is ended. The steps to be stated below will be described assuming that the transmitters 133 and 214 are normal.

Subsequently, the normalities of the signal path 304, the receiver-0 134 and the receiver part 215 in the access terminal function portion 126 are diagnosed using the access point reception power value and TAT reception power value which have been recorded in the RAM 123. The expected value or expectation of the access point reception power value and that of the TAT reception power value can be computed as follows:

(Access point reception power expectation)= (TAT transmission power value)−(Path loss)

(TAT reception power expectation)= (Access point transmission power value)− (Path loss)

Here, the TAT transmission power value and the access point transmission power value are measured values, and they have been recorded in the RAM 123. Further, the path loss is a known value (design value). Therefore, the expected values or expectations of the access point reception power value and TAT reception power value can be computed using the above values. Since, however, error factors exist in the expected values on account of the individual dispersions of the components, a deciding threshold value is provided and is set at, for example, ±3 dB. When the differences between the expected values and the reception power values recorded in the RAM 123 lie within ±3 dB, the components are decided to be normal, and when the differences exceed ±3 dB, the components are decided to be abnormal. Using the decided results, the normalities of the signal path 304, the receiver-0 134 and the receiver part 215 in the access terminal function portion 126 are diagnosed as stated below.

Figure 13:
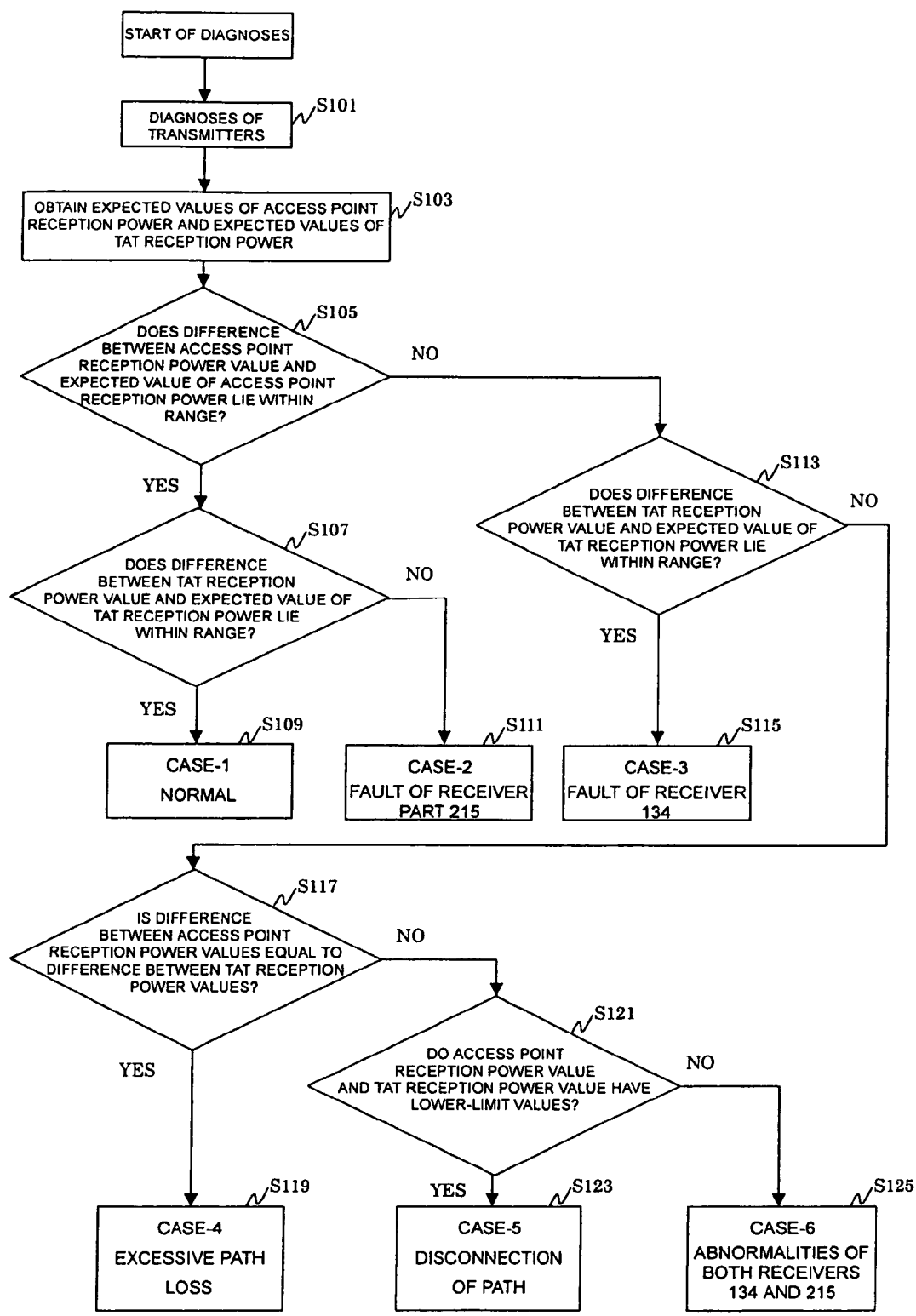
FIG. 13 is a flow chart of normality diagnoses.

FIG. 13 is a flow chart of the normality diagnoses. Now, the normality diagnoses of the signal path, the receiver-0 134 and the receiver part 215 in the access terminal function portion 126 will be described with reference to FIG. 13.

First, the access point controller 115 diagnoses the transmitters (S101). Since the details of the transmitter diagnoses are as stated above, they shall be omitted from description. Subsequently, the access point controller 115 obtains the expected value of the access point reception power and that of the TAT reception power. By way of example, the access point controller 115 reads out the TAT transmission power value, the access point transmission power value and the path loss from the RAM 123, and it obtains the expected values of the access point reception power and TAT reception power in accordance with the above formulae (S103).

Subsequently, the access point controller 115 judges the signal paths 303 and 304, access terminal function portion 126 and receiver part 215 to be normal (S109), in a case where the difference between the access point reception power value reported at the step 718 and the expected value of the access point reception power lies within a first range (for example, ±3 dB) ("YES" at S105), and where the difference between the TAT reception power value reported at the step 711 and the expected value of the TAT reception power lies within a second range (for example, ±3 dB) ("YES" at S107). This case is denoted as "Case-1".

Subsequently, the access point controller 115 diagnoses the receiver part 215 of the access terminal function portion 126 to be abnormal (S11), in a case where the difference between the access point reception power value and the expected value of the access point reception power lies within the first range ("YES" at S105), and where the difference between the TAT reception power value and the expected value of the TAT reception power lies outside the second range ("NO" at S107). In this case, the access point reception power value is normal, and hence, the signal path 303 (including a part common to the path 304) is normal. Further, the transmitter 133 of the access point is normal in view of the step S101. Accordingly, the receiver part 215 of the access terminal function portion 126 is diagnosed to be abnormal. This case is denoted as "Case-2".

Subsequently, the access point controller 115 diagnoses the receiver 134 to be abnormal (S115), in a case where the difference between the access point reception power value and the expected value of the access point reception power lies outside the first range ("NO" at S105), and where the difference between the TAT reception power value and the expected value of the TAT reception power lies within the second range ("YES" at S113). This case is the case of deciding the access point reception power value to be abnormal, and the TAT reception power value to be normal. In this case, the TAT reception power value is normal, and hence, the signal path 304 (including the part common to the path 303) is normal. Further, the transmitter part 214 of the access terminal function portion 126 is normal in view of the step S101. Accordingly, the receiver-0 134 is diagnosed to be abnormal. This case is denoted as "Case-3".

In a case where the difference between the access point reception power value and the expected value of the access point reception power lies outside the first range ("NO" at S105), and where also the difference between the TAT reception power and the expected value of the TAT reception power lies outside the second range ("NO" at S113), the access point controller 115 can judge the paths to be abnormal, or both the receiver 134 of the access point and the receiver part 215 of the access terminal function portion to be abnormal. Besides, diagnoses can be made in more detail as stated below.

The access point controller 115 judges if the difference between the value of the access point reception power and the expected value thereof is equal to or substantially equal to the difference between the value of the TAT reception power and the expected value thereof (S117). Incidentally, regarding the judgment on the substantial equality, by way of example, when both the differences have a difference lying within a predetermined threshold value, they may well be judged to be substantially equal. When the two differences are substantially equal ("YES" at S117), the access point controller 115 can make the diagnosis that the path loss of the signal path 304 is excessive (S119). The reason therefor is that, in the case of the excessive path loss, both the access point reception power value and the TAT reception power value become smaller than the expected values in correspondence with the excessive loss. This case is denoted as "Case-4".

In a case where the difference between the access point reception power value and the expected value of the access point reception power, and the difference between the TAT reception power value and the expected value of the TAT reception power lie outside the first and second ranges, respectively ("NO" at S105 and "NO" at S113), where the difference between the value of the access point reception power and the expected value thereof is not equal to the difference between the value of the TAT reception power and the expected value thereof ("NO" at S117), and where both the access point reception power value and the TAT reception power value are judged to have lower-limit values ("YES" at S121), the access point controller 115 can make the diagnosis that the signal path 304 is disconnected (S123). The reason therefor is that, in the case of the disconnection of the path itself, quite no signal is inputted to the receiver-0 134 and the receiver part 215 of the access terminal function portion 126, so both the access point reception power value and the TAT reception power value become the lower-limit values. Incidentally, the lower-limit values can be stipulated beforehand. This case is denoted as "Case-5".

In a case where the difference between the access point reception power value and the expected value of the access point reception power, and the difference between the TAT reception power value and the expected value of the TAT reception power lie outside the first and second ranges, respectively ("NO" at S105 and "NO" at S113), where the difference between the value of the access point reception power and the expected value thereof is not equal to the difference between the value of the TAT reception power and the expected value thereof ("NO" at S117), and where neither of the access point reception power value and the TAT reception power value is judged to have the lower-limit value ("NO" at S121), the access point controller 115 can diagnose the signal path 304 to be normal, and both the receiver-0 134 and the receiver part 215 of the access terminal function portion 126 to be abnormal (S125). This case is denoted as "Case-6".

Incidentally, regarding the Case-4 through Case-6, by way of example, even when the difference between the value of the access point reception power and the expected value thereof is equal to the difference between the value of the TAT reception power and the expected value thereof at the step S117, both the receivers might be abnormal. By way of example, accordingly, in any of the Case-4 through Case-6, the access point controller 115 judges the path to be abnormal, or both the receiver-0 134 and the receiver part 215 of the access terminal function portion to be abnormal, and it may well render a judgment to the effect that the radio access point might be in any of the Case-4 through Case-6 stated above.

FIG. 11 is a diagram for explaining the diagnosing procedure of steps. The diagnosing procedure of steps will be described by exemplifying numerical values, with reference to FIG. 11. By way of example, the deciding threshold values (first and second ranges) are set at ±3 dB. Besides, assuming, for example, that the TAT transmission power value is −30 dBm and that the path loss is 40 dBm, the expected value of the access point reception power becomes −70 dBm in view of the above formula. Likewise, assuming, for example, that the access point transmission power value is −30 dBm and that the path loss is 40 dBm, the expected value of the TAT reception power becomes −70 dBm in view of the above formula. Although the two expected values will be described as the same values here, they may well be different values.

The Case-1 corresponds to a case, for example, where the access point reception power value is −72 dBm, where the expected value of the access point reception power is −70 dBm, where the measured value of the TAT reception power is −71 dBm, and where the expected value of the TAT reception power is −70 dBm. The difference between the access point reception power values becomes −2 dBm, which lies within the deciding threshold value, and the difference between the TAT reception power values becomes −1 dBm, which lies within the deciding threshold value. Therefore, the receivers 134 and 215 and the path are diagnosed to be normal.

The Case-2 corresponds to a case, for example, where the access point reception power value is −72 dBm, where the expected value of the access point reception power is −70 dBm, where the measured value of the TAT reception power is −80 dBm, and where the expected value of the TAT reception power is −70 dBm. The difference between the access point reception power values becomes −2 dBm, which lies within the deciding threshold value, and the difference between the TAT reception power values becomes −10 dBm, which lies outside the deciding threshold value. Therefore, the receiver part 215 is diagnosed to be faulty.

The Case-3 corresponds to a case, for example, where the access point reception power value is −85 dBm, where the expected value of the access point reception power is −70 dBm, where the measured value of the TAT reception power is 69 dBm, and where the expected value of the TAT reception power is −70 dBm. The difference between the access point reception power values becomes −15 dBm, which lies outside the deciding threshold value, and the difference between the TAT reception power values becomes 1 dBm, which lies within the deciding threshold value. Therefore, the receiver 134 is diagnosed to be faulty.

The Case-4 corresponds to a case, for example, where the deciding threshold values are similarly set at ±3 dBm, where the access point reception power value is −82 dBm, where the expected value of the access point reception power is −70 dBm, where the measured value of the TAT reception power is −83 dBm, and where the expected value of the TAT reception power is −70 dBm. The difference between the access point reception power values becomes −12 dBm, which lies outside the deciding threshold value, and the difference between the TAT reception power values becomes −13 dBm, which lies outside the deciding threshold value. The difference between the access point reception power values is substantially equal to the difference between the TAT reception power values. Therefore, the path 304 is diagnosed to undergo the excessive loss. Incidentally, the numerical value examples of the Case-5 and Case-6 shall be omitted.

In this way, the normalities of the receivers are diagnosed. Although the diagnoses can be made before the receiver sensitivity measurement by way of example, they are not restricted thereto, but they may well be made after the receiver sensitivity measurement. Incidentally, the deciding threshold values can also be set at the start of the diagnoses. Besides, the deciding threshold values need not always be set, but the maintenance engineer can also render decisions in such a way that the measured values (1) and (2) are transmitted to the maintenance terminal 103 so as to be displayed on the display unit of this maintenance terminal 103. Further, the computations of the differences between the measured values and the expected values can be performed on either of the side of the access point controller and the side of the maintenance terminal.

(Calibrations)

Figure 8:
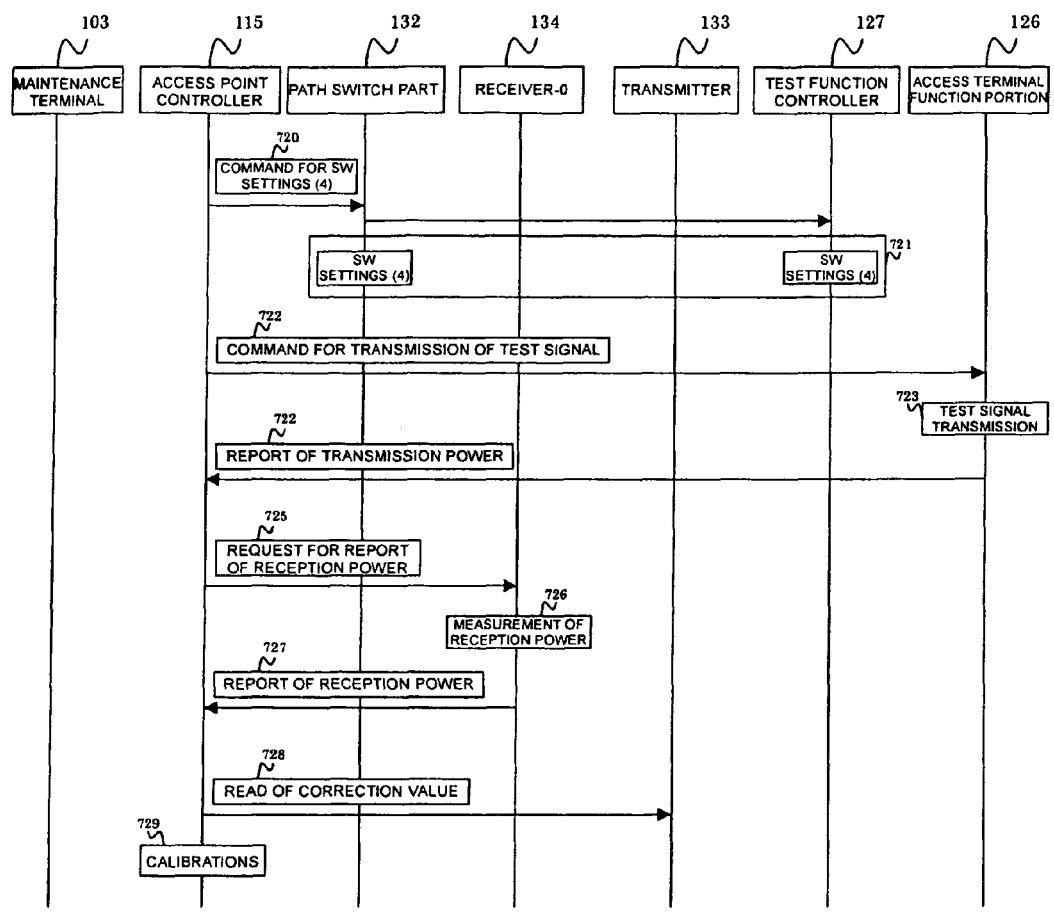
FIG. 8 is a diagram for explaining a sequence in the case of configuring a measurement system in the invention.

FIG. 8 is a sequence diagram for performing the calibrations of each measurement loop. The calibrations of the measurement loop will be described with reference to FIG. 8. Incidentally, a process to be stated below may be executed after the above step 719, or it may well be executed upon receiving a test start command for performing the calibrations of the measurement loop, from the maintenance terminal 103.

At a step 720, the access point controller 115 commands the path switch part 132 and the test function unit 113 to set the switches (SW settings (4)). At a step 721, in compliance with the SW setting command, the switches of the path switch part 132 and test function unit 113 are set so as to pass through, for example, the path 303 in FIG. 4.

At a step 722, the access point controller 115 commands the access terminal function portion 126 to transmit a test signal. The test signal may well contain, for example, the designations of a transmission level and a frequency. By way of example, the test signal designates the transmission level of −70 dBm and the frequency of f2. Incidentally, the level and frequency of the test signal may well be designated from the maintenance terminal 103 by the maintenance engineer. At a step 723, the transmitter part 214 of the access terminal function portion 126 transmits the test signal. The transmitted signal passes through the path 303 in FIG. 4, and is inputted to the receiver-0 134. At a step 724, the access terminal function portion 126 reports transmission power to the access point controller 115. The access point controller 115 stores the reported transmission power in the RAM 123.

At a step 725, the access point controller 115 requests the receiver-0 134 to report a reception power value. At a step 726, the receiver-0 134 measures power being received, in compliance with the report request. At a step 727, the receiver-0 134 reports the measured value of the received power to the access point controller 115. The access point controller 115 stores the reported received power in the RAM 123.

At a step 728, the access point controller 115 reads the correction value of each individual receiver from a ROM which is mounted in the receiver 134. By way of example, the correction value corresponding to the frequency f2 is read.

Figure 12:
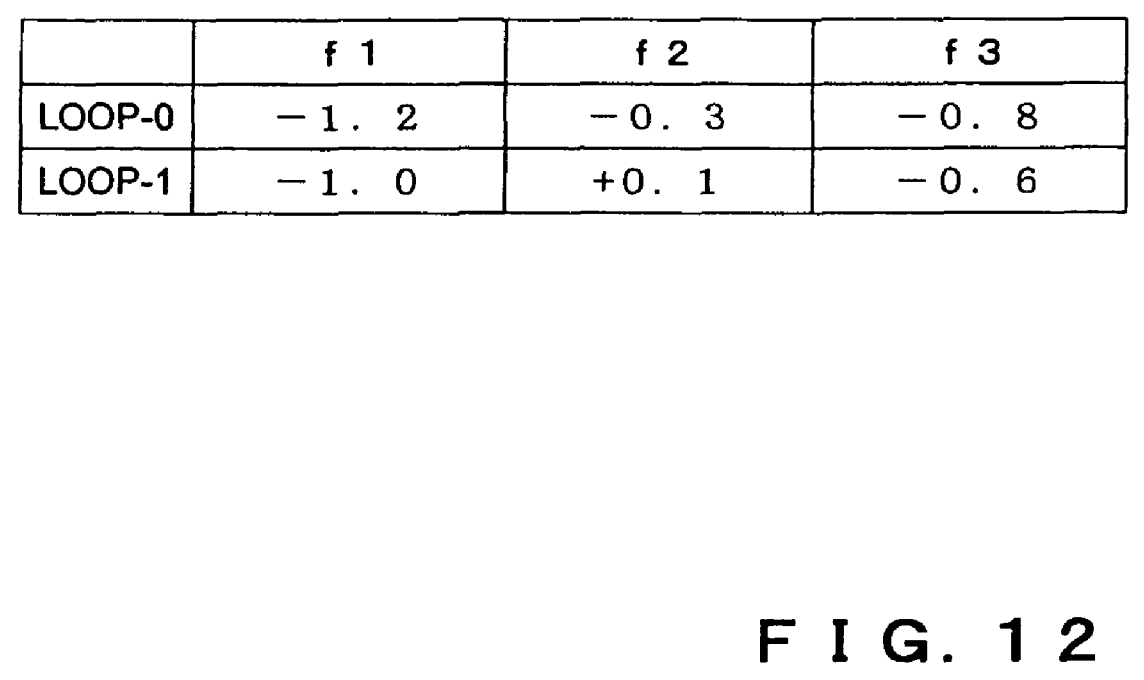

FIG. 12 shows a configurational example of a receiver correcting table which is included in each receiver. By way of example, correction values are stored for respective frequencies beforehand. Each of the correction values indicates, for example, the error between an actual reception power value in the receiver and the reported reception power value. Incidentally, although the correction values for the receivers of the loop-0 and loop-1 are listed in the single table in FIG. 12, the receivers of the individual loops may well include the correction values for the respective frequencies separately.

At a step 729, the access point controller 115 calibrates a section from the test function unit 113 to the input end of the receiver-0 134, on the basis of the value reported from the receiver-0 134. A method for the calibrations will be described below.

(1) The reception power value at the receiver-O end is computed in accordance with the following computational formula:

(Actual power value at Receiver-0 end)=
(Reported value of Reception power)+
Correction value (2) The transmitter part 214 mounted in the access terminal function portion 126, and the reception path are calibrated on the basis of the computed value of the above step (1).

There will be described an example in the case where the transmission power of the access terminal function portion 126 is −30 dBm, while the reported value of the reception power of the receivers 134 is −72 dBm, and where the correction value for the frequency f2 and the loop-0 to-be-handled is −0.3 in view of the receiver correcting table shown in FIG. 12. First, the access point controller 115 computes the power at the receivers end.

(Actual power value at Receiver-0 end)=
Reception power+Correction value=
−72+(−0.3)=−72.3 dBm The actual reception power at the receivers end becomes −72.3 dBm in accordance with the above formula.

Subsequently, the access point controller 115 calibrates the access terminal function portion 126 and the reception loop. First, the access point controller 115 takes the difference between the transmission power of the access terminal function portion 126 and the actual reception power at the receiver end. The transmission power of the access terminal function portion 126 is −30 dBm, and the actual power at the receivers end is −72.3 dBm, so that the difference between the two values becomes 42.3 dBm. This is the loss value of the transmitter part 214 of the access terminal function portion 126 and the signal path by way of example. Assuming that a predetermined path loss stored in, for example, a memory is 40 dBm, a deviation of 2.3 dBm is involved.

When the access terminal function portion transmits power at −27.7 dBm which is 2.3 dBm (calibration value) higher, inclusive of the calibration of the path, the actual power at the receiver-0 end becomes −70 dBm. In this way, the measurement path is calibrated. Besides, the access point controller 115 may well store the obtained loss value and/or a configurational value in a memory or the like. By way of example, the access point controller 115 may use the stored loss value instead of a path loss value in a receiver sensitivity measurement to be described later, or it may well make a transmission power value to-be-designated higher in correspondence with the stored calibration value, at the time of a packet transmission start command.

(Receiver Sensitivity Measurement)

Figure 9:
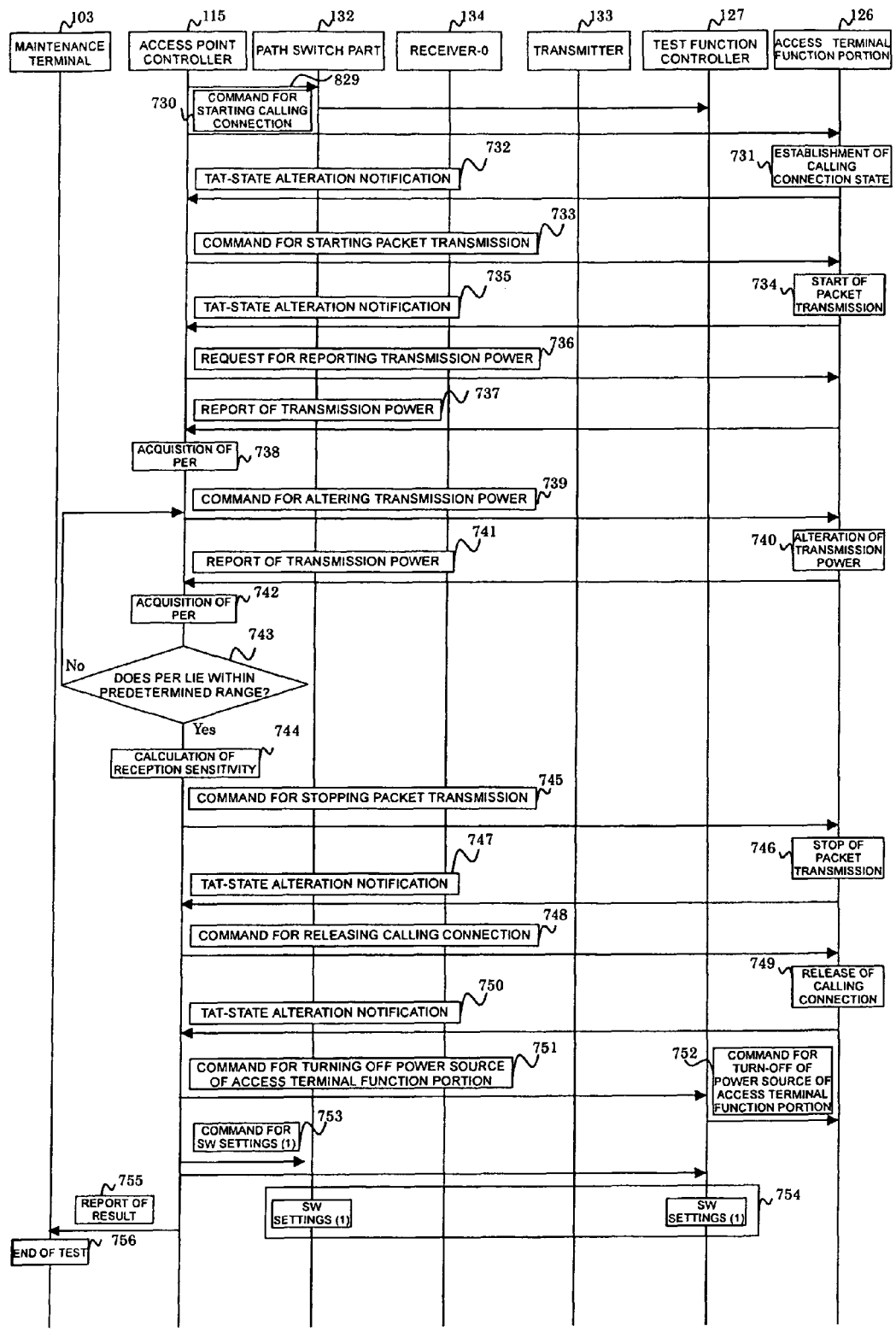
FIG. 9 is a diagram for explaining a sequence in the case of performing the receiver sensitivity measurement in the invention.

FIG. 9 is a sequence diagram of the receiver sensitivity measurement. Incidentally, a process to be stated below may be executed after the above step 729, or it may well be executed upon receiving a test start command for performing the receiver sensitivity measurement, from the maintenance terminal 103.

At a step 829, the access point controller 115 sets the individual SWs as shown in FIG. 6 by way of example. At a step 730, the access point controller 115 commands the test function controller 127 to start a calling connection. At a step 731, the test function controller 127 dials up the test server 104 and establishes a calling connection state. Incidentally, connection destination information items such as the dial number of the test server 104 can be stored in an appropriate memory within the access point controller 115 or test function unit 113 beforehand. At a step 732, the access terminal function portion 126 gives the access point controller 115 "TAT-State alteration notification" which contains information indicating that calling has been connected. Incidentally, the access terminal function portion 126 and the access point controller 115 are capable of transmitting and receiving data therebetween through, for example, the test function controller.

At a step 733, the access point controller 115 commands the access terminal function portion 126 to start packet transmission (packet transmission start command). The packet transmission start command can contain, for example, the calibrated power value stated before (for example, −27.7 dBm). At a step 734, the access terminal function portion 126 having received the packet transmission start command starts the packet transmission to the server. At a step 735, the access terminal function portion 126 gives the access point controller 115 "TAT-State alteration notification" which contains information indicating that the packet transmission has been started.

At a step 736, the access point controller 115 requests the access terminal function portion 126 to report the transmission power of this access terminal function portion 126 (transmission power report request). At a step 737, in compliance with the transmission output report request, the access terminal function portion 126 reports its transmission power to the access point controller 115. By way of example, the access terminal function portion 126 reports the mean value of the transmission power for a predetermined time period before or after the reception of the transmission power report request. Alternatively, it may well report the instantaneous value of the transmission power at the time of the reception of the transmission power report request. The access point controller 115 stores the reported transmission power value P1 in the memory.

At a step 738, the access point controller 115 acquires a PER (packet error rate). The PER can be measured as stated below by way of example. Each of the sectors has the function of requesting the access terminal function portion 126 to retransmit packets which cannot be demodulated due to errors, in demodulating a forward signal transmitted from this access terminal function portion 126. It is accordingly possible to count the number of the packets for which the retransmission request was made on account of the errors (hereinbelow, called the "number of the error packets"), and the number of packets which were normally received, among the packets of the forward signal as were received by each sector. Each sector counts the number of the error packets and the number of the packets normally received, and calculates the PER in accordance with the following formula:

PER[%]=(Number of Error packets)/
(Total number of Received packets)

Incidentally, the total number of received packets is the total of the number of the error packets and the number of the packets normally received.

The access point controller 115 requests, for example, the sector-1 (for example, the demodulator 137) to report the value of the PER, and it can acquire the PER transmitted in compliance with the request. Incidentally, the access point controller 115 may well acquire the number of the error packets and the number of the packets normally received (or the total number of the received packets), so as to obtain the PER in accordance with the above formula. Besides, the access point controller 115 stores the acquired PER in the memory.

At a step 739, the access point controller 115 commands the access terminal function portion 126 to alter the transmission power, in accordance with the PER (transmission power alteration command). By way of example, in a case where the measured PER is lower than prescribed threshold values, the access point controller 115 commands the access terminal function portion 126 to lower the transmission power, and conversely, in a case where the PER is higher than the prescribed threshold values, the former 115 commands the latter 126 to heighten the transmission power. Incidentally, the transmission power of the access terminal function portion 126 may well be altered by changing the attenuation magnitude of the forward link attenuator 222 in a state where this transmission power is once fixed at its value at the above calibration.

At a step 740, the access terminal function portion 126 alters the transmission power in compliance with the command from the access point controller 115. At a step 741, the access terminal function portion 126 reports the altered transmission power to the access point controller 115. At a step 742, the access point controller 115 acquires the PER again and stores the acquired PER in the memory 123.

At a step 743, the access point controller 115 judges if the PER lies within the prescribed range of the threshold values. In a case where the PER lies within the prescribed range of the threshold values, the access point controller 115 shifts to the processing of a step 744. On the other hand, in a case where the measured PER does not lie within the prescribed range of the threshold values, the access point controller 115 returns to the processing of the step 739 and repeats the processing of the steps 739-742 and 743, thereby to adjust the transmission power of the access terminal function portion 126 so that the PER may come to lie within the prescribed range of the threshold values.

At the step 744, the access point controller 115 records the reported value of the transmission power of the access terminal function portion 126 in the memory 123 as a reception sensitivity value. Alternatively, the access point controller 115 may well calculate the reception sensitivity from the reported value of the transmission power of the access terminal function portion 126 and the value of the loss of the section of the access terminal function portion 126—the receiver 134. By way of example, the access point controller 115 reads out the reported transmission power value of the access terminal function portion 126 and the path loss value by referring to the RAM 123, and it calculates the reception sensitivity in accordance with the following formula:

Reception sensitivity=(Transmission power value of Access terminal function portion)−(Path loss value)

The transmission power of the access terminal function portion 126 as employed here is the transmission power whose PER has been brought into the prescribed range of the threshold values by repeating the above processing, and it is stored in the memory by way of example. Besides, the value of the path loss can be fixed to a value which can attenuate the transmission power of the access terminal function portion 126 down to a reception sensitivity point. That is, a value which is fixedly stipulated at the design of the apparatus may well be employed as the path loss value. Alternatively, the loss value (−42.3 dBm by way of example) obtained by the above calibration may well be employed. Since a manufactural dispersion is involved in the path loss value, the value of the loss can be measured at the manufacture of the apparatus so as to store the measured value in an appropriate memory. Here, the "reception sensitivity point" indicates that power value of the reception power of the access point 100 below which the reception becomes impossible.

Further, the access point controller 115 may well judge whether or not a receiver failure has occurred, on the basis of the reception sensitivity and in accordance with, for example, whether the reception sensitivity is greater or less than a predetermined threshold value, or whether it lies within or outside a predetermined range, so as to store a judged result in the memory.

At a step 745, the access point controller 115 commands the access terminal function portion 126 to stop the packet transmission (packet transmission stop command). At a step 746, the access terminal function portion 126 stops the packet transmission in compliance with the packet transmission stop command. At a step 747, the access terminal function portion 126 gives the access point controller 115 "TAT-State alteration notification" which contains information indicating that the packet transmission has been stopped.

At a step 748, the access point controller 115 commands the access terminal function portion 126 to release the calling connection (calling connection release command). At a step 749, the access terminal function portion releases the calling connection in compliance with the calling connection release command. At a step 750, the access terminal function portion 126 gives the access point controller 115 "TAT-State alteration notification" which contains information indicating that the calling connection has been released.

At a step 751, the access point controller 115 commands the test function controller 127 to turn OFF the power source of the access terminal function portion 126 (power source turn-OFF command). At a step 752, the test function controller 127 having received the power source turn-OFF command turns OFF the power source of the access terminal function portion 126.

At a step 753, the access point controller 115 commands the path switch part 132 and the function unit 113 to set the switches. At a step 754, the switches of the path switch part 132 and test function unit 113 are set so as to pass through the paths 301 and 302 in FIG. 3 (SW settings (1)). Thus, an ordinary operation state is resumed.

At a step 755, the access point controller 115 reports a test result to the maintenance terminal 103. The test result can contain, for example, the reception sensitivity and/or the judged result based on the reception sensitivity. At a step 756, the maintenance terminal 103 receives the test result, and it displays the received test result and/or stores the same in a storage portion, whereupon the test is ended.

Incidentally, the test can also be carried out as the three divided stages of the measurement path diagnosis (reception path diagnosis) in FIG. 7, the measurement loop calibrations (reception sensitivity correction) in FIG. 8 and the receiver sensitivity measurement in FIG. 9. Alternatively, the test may well be carried out in the combination of the reception sensitivity correction and the receiver sensitivity measurement, or that of the receiver sensitivity measurement and the reception path diagnosis. Further, it may well be performed in an appropriate sequence. By way of example, in a case where the reception sensitivity has not been normally obtained in the receiver sensitivity measurement in FIG. 9, the reception path diagnosis in FIG. 7 may well be performed so as to specify a failing part.

According to the invention, the reception sensitivity of a radio access point can be precisely measured without involving a service interruption, remotely and on-line, and without being affected by external noise. Also, it is possible to provide means for specifying a cause in a case where a desired sensitivity has not been attained.

The invention is applicable to, for example, industries which concern a mobile communication system or access point.

What is claimed is:

1. A radio access point comprising:
an access terminal function portion which includes a transmitter part for transmitting signals and a receiver part for receiving signals, and which serves to test the radio access point;
either of a receiver of one loop and receivers of two loops, for receiving forward signals that are transmitted from said access terminal function portion and a communication terminal;
a transmitter for transmitting reverse signals that are transmitted to said access terminal function portion and said communication terminal;
a path switch part for switching to connect an input end of said receiver with an antenna or not, and for switching paths of the signal from said transmitter and the signal toward said receiver; and
a controller which receives a test start command, terminates the input end of said receiver by said path switch part in compliance with the command, connects a desired one of said transmitter and said receiver with said access terminal function portion and, controls a measurement path diagnosis which acquires a first reception power value of said receiver in the case of connecting said receiver with said transmitter part of said access terminal function portion and, in which failures of said receiver are diagnosed depending upon whether or not a difference between the first reception power value and a predetermined first reception power expectation lie within predetermined ranges.

2. A radio access point comprising:
an access terminal function portion which includes a transmitter part for transmitting signals and a receiver part for receiving signals, and which serves to test the radio access point;
either of a receiver of one loop and receivers of two loops, for receiving forward signals that are transmitted from said access terminal function portion and a communication terminal;
a transmitter for transmitting reverse signals that are transmitted to said access terminal function portion and said communication terminal;
a path switch part for switching to connect an input end of said receiver with an antenna or not, and for switching paths of the signal from said transmitter and the signal toward said receiver; and
a controller which receives a test start command, terminates the input end of said receiver by said path switch part in compliance with the command, connects a desired one of said transmitter and said receiver with said access terminal function portion and, controls a measurement path diagnosis which acquires a second reception power value of said access terminal function portion in the case of connecting said transmitter with said receiver part of said access terminal function portion, and in which failures of said receiver part of said access terminal function portion are diagnosed depending upon whether or not a difference between the second reception power value and a predetermined second reception power expectation lie within predetermined ranges.

3. A radio access point comprising:
an access terminal function portion which includes a transmitter part for transmitting signals and a receiver part for receiving signals, and which serves to test the radio access point;
either of a receiver of one loop and receivers of two loops, for receiving forward signals that are transmitted from said access terminal function portion and a communication terminal;
a transmitter for transmitting reverse signals that are transmitted to said access terminal function portion and said communication terminal;
a path switch part for switching to connect an input end of said receiver with an antenna or not, and for switching paths of the signal from said transmitter and the signal toward said receiver; and
a controller which receives a test start command, terminates the input end of said receiver by said path switch part in compliance with the command, connects a desired one of said transmitter and said receiver with said access terminal function portion and, controls a measurement path diagnosis which acquires a first reception power value of said receiver in the case of connecting said receiver with said transmitter part of said access terminal function portion, and a second reception power value of said access terminal function portion in the case of connecting said transmitter with said receiver part of said access terminal function portion, and in which failures of said receiver and the signal path are diagnosed depending upon whether or not a difference between the first reception power value and a predetermined first reception power expectation, and a difference between the second reception power value and a predetermined second reception power expectation lie within predetermined ranges.

4. A radio access point according to claim 3, wherein in the measurement path diagnosis, said controller performs:
connecting said receiver and said transmitter part of said access terminal function portion by said path switch part;
causing said transmitter part of said access terminal function portion to transmit a predetermined test signal;
acquiring the first reception power value of said receiver;
connecting said transmitter and said receiver part of said access terminal function portion by said path switch part so that part of the signal from said transmitter may be received by said receiver part of said access terminal function portion;
acquiring the second reception power value of said access terminal function portion;
deciding whether the difference between the first reception power value of said receiver and the predetermined first reception power expectation lies within or outside the first range;
deciding whether the difference between the second reception power value of said access terminal function portion and the predetermined second reception power expectation lies within or outside the second range; and
judging any one of normality, a failure of said receiver, a failure of said receiver part of said access terminal function portion, abnormality of the signal path, and failures of both said receiver and said receiver part of said access terminal function portion, in accordance with a combination of results of the decisions.

5. A radio access point according to claim 4, wherein in the measurement path diagnosis, said controller further performs:

acquiring the first transmission power value of said access terminal function portion in the case where said receiver is connected with said transmitter part of said access terminal function portion;

acquiring the second transmission power value of said transmitter in the case where said transmitter is connected with said receiver part of said access terminal function portion;

obtaining the first reception power expectation by subtracting a predetermined path loss value from the first transmission power value of said access terminal function portion; and obtaining the second reception power expectation by subtracting a predetermined path loss value from the second transmission power value of said transmitter.

6. A radio access point according to claim 4, wherein in the measurement path diagnosis, said controller further performs:

judging as an excessive loss of the signal path if the difference between the first reception power value of said receiver and the first reception power expectation is substantially equal to the difference between the second reception power value of said access terminal function portion and the second reception power expectation; and/or rendering a judging of disconnection of the signal path in a case where both the first reception power value of said receiver and the second reception power value of said access terminal function portion are predetermined values.

7. A radio access point according to claim 3, wherein said path switch part includes:

a first directional coupler which interconnects said antenna or a terminating part for termination, said access terminal function portion, and said receiver or said transmitter;

a first switch which effects switching so as to connect said first directional coupler to said antenna or to said terminating part;

a second switch which effects switching so as to connect said first directional coupler to said receiver or to said transmitter; and a second directional coupler which interconnects said transmitter, said antenna, and the path toward said access terminal function portion, wherein said first switch is set onto the terminating side, and said second switch is set onto the receiver side, thereby to connect said receiver with said transmitter part of said access terminal function portion, and wherein said first switch is set onto the terminating side, and said second switch is set onto the transmitter side, thereby to connect said transmitter with said receiver part of said access terminal function portion.

8. A radio access point according to claim 3, wherein said controller performs:

reading out a correction value which indicates an error between an actual reception power value in said receiver and the reported reception power value, from a storage unit where the correction value is stored beforehand; and correcting the acquired first reception power value of said receiver with the correction value, and/or correcting a transmission power value which is to be designated for said access terminal function portion, on the basis of the corrected first reception power value and the first transmission power value of said access terminal function portion, so that desired transmission power may be transmitted from said access terminal function portion or that said receiver may receive desired reception power.

9. A method of testing a radio access point which has an access terminal function portion which includes a transmitter part for transmitting signals and a receiver part for receiving signals, and which serves to test a radio access point;

either of a receiver of one loop and receivers of two loops, for receiving forward signals that are transmitted from the access terminal function portion and a communication terminal;

a transmitter for transmitting reverse signals that are transmitted to the access terminal function portion and the communication terminal;

a path switch part for switching to connect an input end of the receiver with an antenna or not, and for switching paths of the signal from the transmitter and the signal toward the receiver; and a controller which controls the radio access point;

the method comprising:

receiving a test start command;

terminating the input end of said receiver by said path switch part in compliance with the test start command, and connecting a desired one of said transmitter and said receiver with said access terminal function portion; and controlling a measurement path diagnosis which acquires a first reception power value of said receiver in the case of connecting said receiver with said transmitter part of said access terminal function portion, and a second reception power value of said access terminal function portion in the case of connecting said transmitter with said receiver part of said access terminal function portion, and in which failures of said receiver and the signal path are diagnosed depending upon whether or not a difference between the first reception power value and a predetermined first reception power expectation, and a difference between the second reception power value and a predetermined second reception power expectation lie within predetermined ranges.

* * * * *